US012701414B2

(12) United States Patent
Liu et al.

(10) Patent No.: US 12,701,414 B2
(45) Date of Patent: Aug. 4, 2026

(54) USER EQUIPMENT-TO-NETWORK RELAY SECURITY FOR PROXIMITY BASED SERVICES

(71) Applicant: ZTE CORPORATION, Shenzhen (CN)

(72) Inventors: Yuze Liu, Shenzhen (CN); Shilin You, Shenzhen (CN); Jin Peng, Shenzhen (CN); Zhen Xing, Shenzhen (CN); Zhaoji Lin, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 266 days.

(21) Appl. No.: 18/646,542

(22) Filed: Apr. 25, 2024

(65) Prior Publication Data
US 2024/0305981 A1 Sep. 12, 2024

Related U.S. Application Data

(63) Continuation of application No. PCT/CN2022/075148, filed on Jan. 30, 2022.

(51) Int. Cl.
*H04W 12/06* (2021.01)
*H04W 12/0431* (2021.01)
*H04W 12/72* (2021.01)

(52) U.S. Cl.
CPC ....... *H04W 12/06* (2013.01); *H04W 12/0431* (2021.01); *H04W 12/72* (2021.01)

(58) Field of Classification Search
CPC .................................................... H04W 12/06
USPC ........................................................ 455/410
See application file for complete search history.

(56) References Cited

U.S. PATENT DOCUMENTS

| | | | |
|---|---|---|---|
| 11,757,946 B1 * | 9/2023 | Shemesh | ............... H04L 43/026 |
| 2016/0088475 A1 * | 3/2016 | Zhang | ................... H04W 12/06 |
| | | | 726/7 |
| 2020/0068391 A1 | 2/2020 | Liu | |
| 2021/0143893 A1 * | 5/2021 | Taneja | ................... H04B 7/155 |
| 2022/0124079 A1 * | 4/2022 | Patil | ........................ H04L 63/08 |

FOREIGN PATENT DOCUMENTS

| | | |
|---|---|---|
| CN | 102461233 A | 5/2012 |
| JP | 2009-111734 A | 5/2009 |

(Continued)

OTHER PUBLICATIONS

Examination Search Report on CA dated Appl. No. 3236441 Dec. 30, 2025 (4 pages).

(Continued)

*Primary Examiner* — Qutbuddin Ghulamali
(74) *Attorney, Agent, or Firm* — Foley & Lardner LLP

(57) ABSTRACT

Presented are systems, methods, apparatuses, or computer-readable media for authenticating remote wireless communication devices. An authentication server function (AUSF) may send, to a unified data management (UDM), a request for authentication vectors (AV) in association with a remote wireless communication device seeking authorization to access a network via a relay wireless communication device. The request may include an indicator to indicate to the UDM to bypass storing information related to the AUSF. The AUSF may receive, from the UDM, the AV in response to the request.

16 Claims, 8 Drawing Sheets

(56)          References Cited

FOREIGN PATENT DOCUMENTS

WO     WO-2021/034093  A1     2/2021
WO     WO-2021/167200  A1     8/2021

OTHER PUBLICATIONS

International Search Report and Written Opinion for PCT Appl. No.
PCT/CN2022/075148 mailed Oct. 17, 2022 (8 pages).
Office Action for KR Appl. No. 10-2024-7013981, dated Aug. 7,
2025 (with English translation, 6 pages).
"3rd Generation Partnership Project; Technical Specification Group
Services and System Aspects; Security architecture and procedures
for 5G system (Release 16)", 3GPP TS 33.501 V16.9.1 (Jan. 2022),
257 pages.
"3rd Generation Partnership Project; Technical Specification Group
Services and System Aspects; Security Aspects of Proximity based
Services (ProSe) in the 5G System (5GS) (Release 17)", 3GPP TS
33.503 V0.2.0 (Nov. 2021), 31 pages.
Extended European Search Report for EP Appl. No. 22922926.5,
dated Oct. 29, 2024 (10 pages).
S3, "Handling of KAUSF upon successful primary authentication",
3GPP TSG-SA3 Meeting #103-e, S3-212290 (SP-210449), May 28,
2021, e-meeting (22 pages).
Samsung et al., "Proposal for U2NW relay authentication, autho-
rization and key management", 3GPP TSG-SA3 Meeting #105-e,
S3-214218, Nov. 19, 2021, e-meeting (6 pages).
Rejection Decision on KR Appl. No. 10-2024-7013981 dated Mar.
12, 2026 (6 pages).
Examination Report on IN Appl. No. 202427032429 dated Mar. 30,
2026 (18 pages).

* cited by examiner

USER EQUIPMENT-TO-NETWORK RELAY SECURITY FOR PROXIMITY BASED SERVICES

CROSS-REFERENCE TO RELATED APPLICATION

This application claims the benefit of priority under 35 U.S.C. § 120 as a continuation of International Patent Application No. PCT/CN2022/075148, filed on Jan. 30, 2022, the disclosure of which is incorporated herein by reference in its entirety.

TECHNICAL FIELD

The disclosure relates generally to wireless communications, including but not limited to systems and methods for authenticating remote wireless communication devices.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, a method, an apparatus, or a computer-readable medium for authenticating remote wireless communication devices. An authentication server function (AUSF) may send, to a unified data management (UDM), a request for authentication vectors (AV) in association with a remote wireless communication device seeking authorization to access a network via a relay wireless communication device. The request may include an indicator to indicate to the UDM to bypass storing information related to the AUSF. The AUSF may receive, from the UDM, the AV in response to the request.

In some embodiments, the AUSF may initiate authentication of the remote wireless communication device, in response to the information related to the AUSF. In some embodiments, the indicator may include at least one of: an identifier of the remote wireless communication device, a subscriber concealed identifier (SUCI), a subscriber permanent identifier (SUPI), or a name of the network. In some embodiments, the indicator may include a relay service code or other service code, a freshness parameter value, or a default or defined value.

At least one aspect is directed to a system, a method, an apparatus, or a computer-readable medium for authenticating remote wireless communication devices. An authentication server function (AUSF) may send, to a unified data management (UDM), a request for authentication vectors (AV). The AUSF may initiate authentication of a remote wireless communication device seeking authorization to access a network via a relay wireless communication device. The AUSF may send, to the UDM, a message after completion of the authentication, to indicate to the UDM to bypass storing information related to the AUSF.

In some embodiments, the AUSF may initiate the authentication of the remote wireless communication device, in response to the information related to the AUSF. In some embodiments, the information related to the AUSF may include at least one of: an identifier of the AUSF, or the AV. In some embodiments, the AUSF may receive from a relay access and mobility management function (AMF), an authentication request. The authentication request may include at least one of: an identifier of the remote wireless communication device, a subscriber concealed identifier (SUCI), a relay service code, a nonce, or a name of the network.

In some embodiments, after completion of the authentication, the relay AMF may not initiate a network access stratum (NAS) security mode command (SMC) procedure with the remote wireless communication device. In some embodiments, the relay AMF may not initiate the NAS SMC procedure, based on information comprising at least one of: a relay service code, a remote wireless communication device's identity, or a subscriber concealed identifier (SUCI).

In some embodiments, after successful completion of the authentication, the AUSF may generate a proximity services key. In some embodiments, the AUSF may send, to a relay wireless communication device via the relay AMF, an authentication response message comprising the proximity services key. In some embodiments, the AUSF may cause the relay AMF to send a relay key response to the relay wireless communication device. The relay AMF may delete information related to the remote wireless communication device.

In some embodiments, the information related to the relay wireless communication device may include at least one of: non access stratum security context information, an access and mobility management function (AMF) key, the remote wireless communication device's identity, a subscriber concealed identifier (SUCI) or a subscriber permanent identifier (SUPI).

At least one aspect is directed to a system, a method, an apparatus, or a computer-readable medium for authenticating remote wireless communication devices. A unified data management (UDM) may receive, from an authentication server function (AUSF) to, a request for authentication vectors (AV) in association with a remote wireless communication device seeking authorization to access a network via a relay wireless communication device. The request may include an indicator to indicate to the UDM to bypass storing information related to the AUSF. The UDM may send, to the AUSF, the AV in response to the request.

At least one aspect is directed to a system, a method, an apparatus, or a computer-readable medium for authenticating remote wireless communication devices. A unified data management (UDM) may receive, from an authentication server function (AUSF), a request for authentication vectors (AV). The UDM may cause the AUSF to initiate authentication of a remote wireless communication device seeking authorization to access a network via a relay wireless communication device. The UDM may receive, from the AUSF, a message after completion of the authentication, to indicate to the UDM to bypass storing information related to the AUSF.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1:
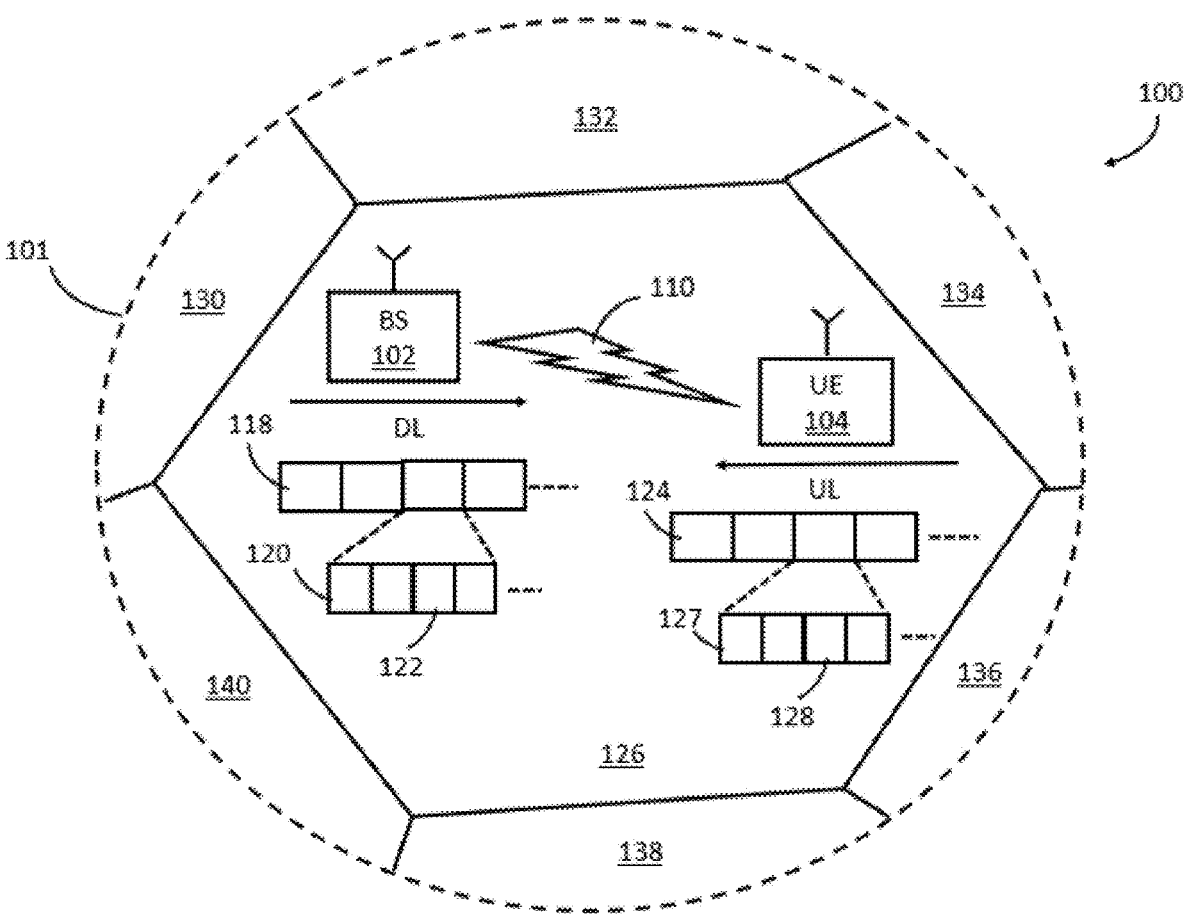
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
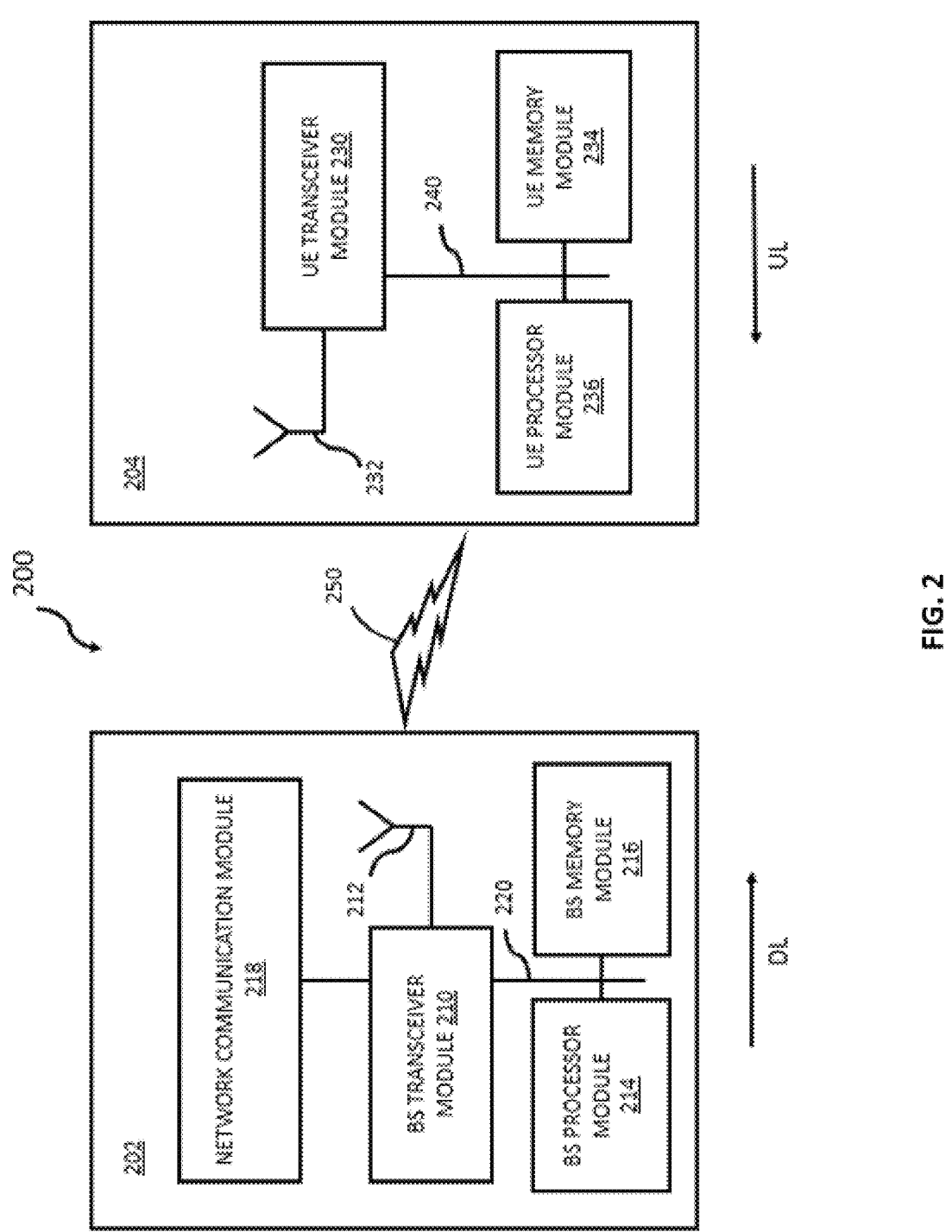
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Authenticating Remote Wireless Communication Devices Via User Equipment to Network Relays A 3GPP system may be able to authorize a user equipment (UE) to access a 5G core network (5GC) via a 5G UE-to-network relay and to authorize a UE to perform as a UE-to-network relay. Without a proper authorization, unauthorized entities may be able to access the 5GC via UE-to-network relay or act as UE-to-network relays. Therefore, introducing vulnerability and causing possible distributed denial-of-service ((DDOS) attacks or leading to unauthorized service usage on both 5GS and UE-to-network Relay.

Security procedures over a control plane may be performed. According this procedure, however, the remote UE may run a primary authentication with a remote authentication server function (AUSF) and a remote UDM. The remote AUSF may obtain an authentication vector (AV) from the UDM to trigger the primary authentication. This authentication may be performed between the remote AUSF and the remote UE via the relay access and mobility management function (AMF) and the relay UE. The remote AUSF may not make the newly derived secret keys, $K_{AUSF}$ as the latest $K_{AUSF}$. At the remote UE, the newly derived $K_{AUSF}$ may not be taken as latest $K_{AUSF}$ as a network access stratum (NAS) security mode command (SMC) procedure is not performed between remote UE and relay AMF.

However, the UDM may utilize the network function repository function (NRF) to discover the AUSF instances unless the AUSF information is available by other means such as a AUSF ID(s) locally configured or stored on UDM. The UDM may select an AUSF instance based on the available AUSF instance(s) obtained from the NRF or based on locally configured information, and information (e.g., AUSF ID, UE identity, or subscription permanent identifier (SUPI)) stored (by the UDM) from a previously successful authentication.

Therefore, the UDM may store the remote AUSF instance ID, but the remote AUSF may not have the $K_{AUSF}$ for the remote UE. This can result in some service failure such as a UE parameter update (UPU) or steering of roaming (SOR), which can entail the UDM to select an AUSF which stores the latest $K_{AUSF}$.

Figure 3:
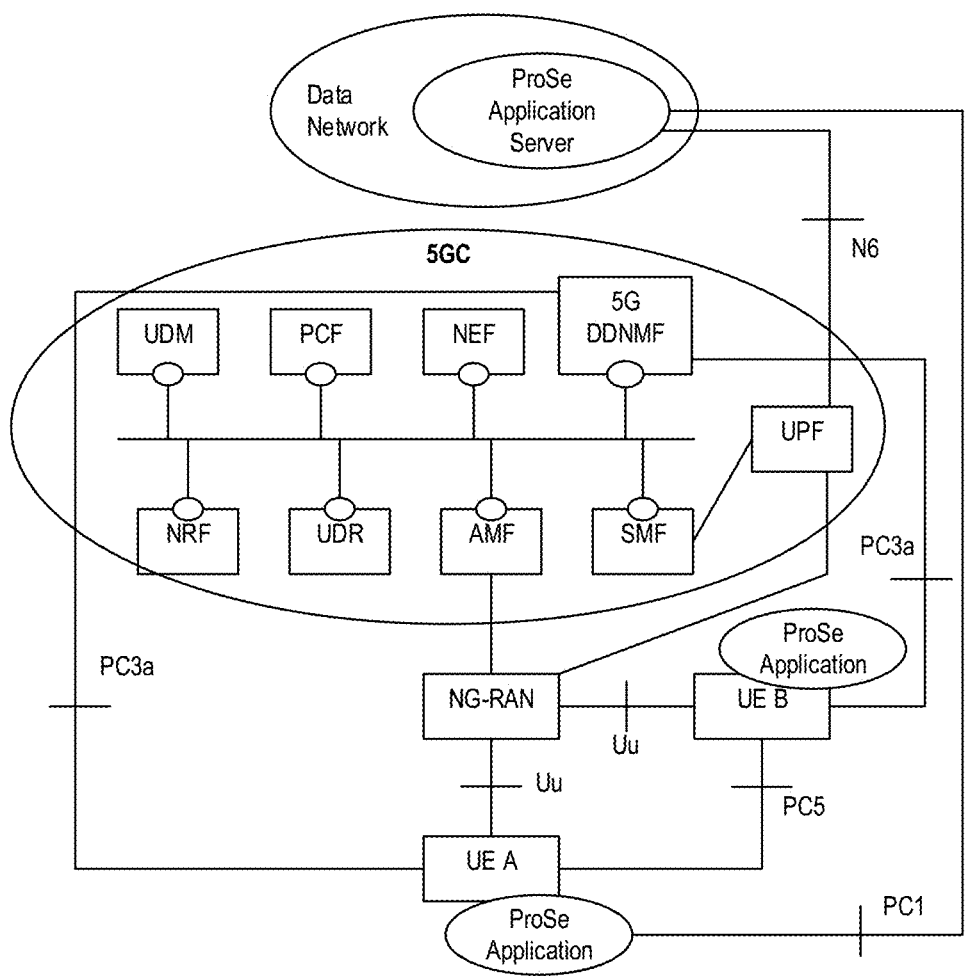
FIG. 3 illustrates a block diagram of an architecture for accessing network via user equipment (UE) to network relay to authorize UEs in accordance with an illustrative embodiment.

A. Accessing Network Via User Equipment to Network Relay to Authorize User Equipment Referring now to FIG. 3, depicted is a block diagram of an architecture for accessing network via user equipment (UE) to network relay to authorize UEs. In the architecture, a 5G direct discovery name management function (DDNMF) may be introduced into 5GC as a new network function. 5G DDNMF may have similar functions from architecture point of view to the DDNMF part of proximity services (ProSe) Function.

Figure 4:
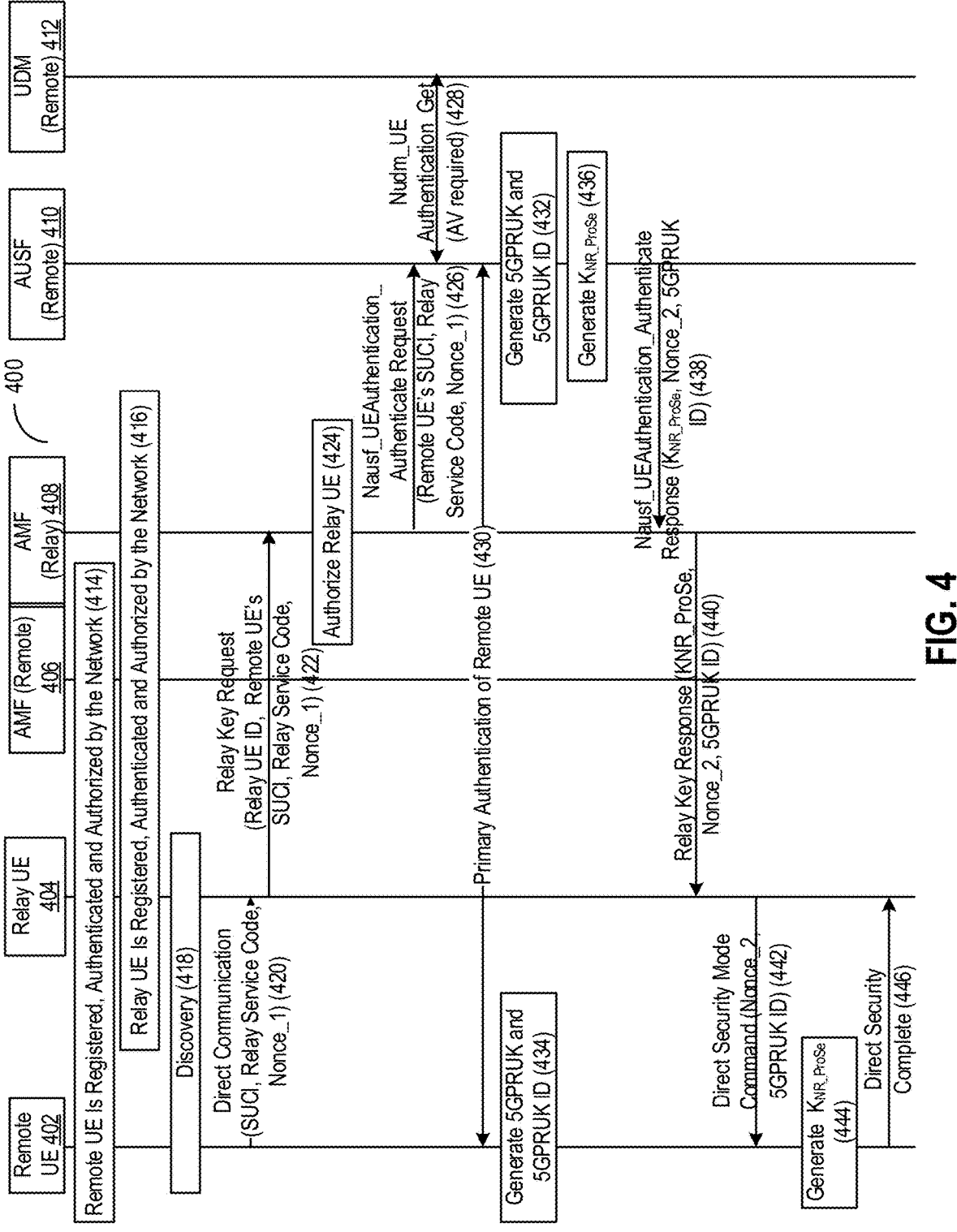
FIG. 4 illustrates a block diagram of a process of performing a security procedure over a control plane in accordance with an illustrative embodiment.

Referring now to FIG. 4, depicted is a block diagram of a process 400 of performing a security procedure over a control plane. At steps 414 and 416, the remote UE 402 and relay UE 404 may be registered with the network (e.g., via a remote AMF 406). The UE-to-Network relay may be authenticated and authorized by the network to support as a relay UE 404. Remote UE 402 may be authenticated and authorized by the network to act as a Remote UE 402. At step 418, the remote UE 402 may initiate discovery procedure using any of Model A or Model B method.

At steps 420-426, after the discovery of the UE-to-Network relay, the Remote UE 402 may send a Direct Communication Request to the relay UE 404 for establishing secure PC5 unicast link. The Remote UE 402 may include its security capabilities and security policy in the dynamic channel reservation (DCR) message. The message may also include a subscription concealed identifier (SUCI), a Relay Service Code, and a Nonce_1. Upon receiving the Direct Communication Request, the Relay UE 404 may send the relay key request to the relay AMF 408, including the parameters received in the DCR message. The Relay AMF 408 may verify whether the relay UE 404 is authorized to act as UE-to-network (U2N) relay. The relay AMF 408 may select the remote AUSF 410 based on the SUCI and can forward the key request to the AUSF in a Nausf_UEAuthentication_Authenticate Request message.

At steps 428 and 430, the remote AUSF 410 may retrieve the Authentication Vectors (AVs) from the UDM 412, and can trigger primary authentication of the remote UE 402 using existing procedure. This authentication may be performed between the remote AUSF 410 and the remote UE 402 via the relay AMF 408 and relay UE. Remote AUSF 410 may not make the newly derived $K_{AUSF}$ as the latest $K_{AUSF}$. At the remote UE 402, the newly derived $K_{AUSF}$ may not be taken as latest $K_{AUSF}$ as NAS SMC procedure is not performed between remote UE 402 and relay AMF.

At step 432 and 434, on successful primary authentication, the remote AUSF 410 and Remote UE 402 may generate a 5G proximity service remote user key (5GPRUK) and 5GPRUK ID a using the newly derived $K_{AUSF}$. At step 436, the AUSF may generate the NR proximity services key ($K_{NR\_ProSe}$). At steps 438 and 440, the remote AUSF 410 may send the 5GPRUK ID, $K_{NR\_ProSe}$, Nonce_2 in a Nausf_UEAuthentication_Authenticate Response message to the UE-to-Network relay via the relay AMF. When receiving a $K_{NR\_ProSe}$ from remote AUSF, the relay AMF 408 may not attempt to trigger NAS SMC procedure with Remote UE 402. Relay UE 404 derives PC5 session key $K_{relay\text{-}sess}$ and confidentiality and integrity keys from $K_{NR\_ProSe}$, using the key distribution function (KDF). $K_{NR\_ProSe}$ ID and $K_{relay\text{-}sess}$ ID may be established in the same way as $K_{NRP}$ ID and $K_{NRP\text{-}sess}$ ID.

At step 442, the UE-to-Network relay may send the received 5GPRUK ID, Nonce_2 to the remote UE 402 in Direct Security mode command message. At step 444 and 446, the remote UE 402 may use the 5GPRUK ID to locate the $K_{AUSF}$/5GPRUK to be used for the PC5 link security. The remote UE 402 may generate the $K_{NR\_ProSe}$ key to be used for Remote access via the relay UE 404 in the same way as defined in step 436. The remote UE 402 may derive PC5 session key $K_{relay\text{-}sess}$ and confidentiality and integrity keys from $K_{NR\_ProSe}$ the same way as defined in step 440. The remote UE 402 may send the Direct Security mode complete message to the UE-to-Network relay. Further communication between Remote UE 402 and Network may take place securely via the UE-to-Network relay.

Figure 5:
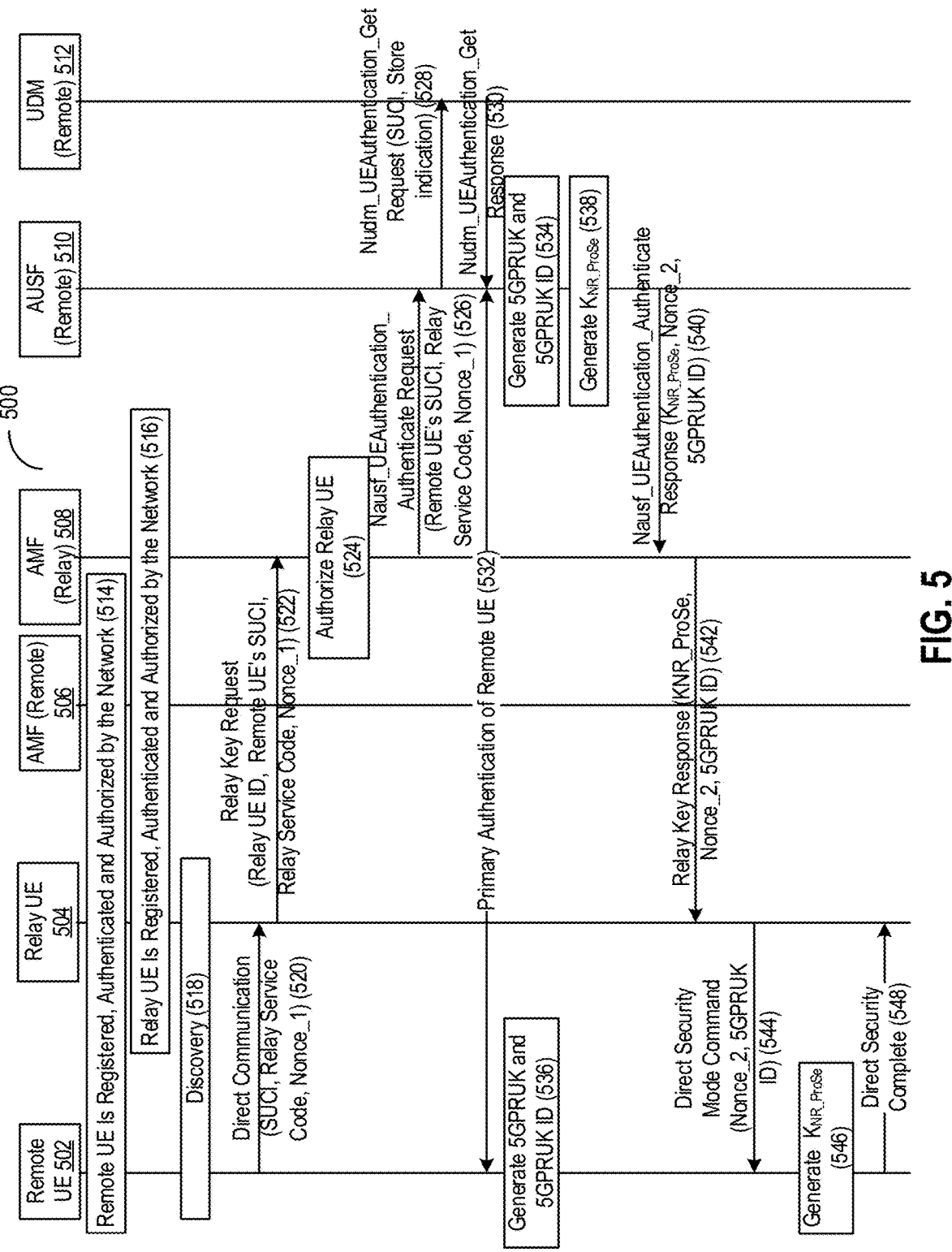
FIG. 5 illustrates a block diagram of a process of performing a security procedure over a control plane with an indication to bypass storage in accordance with an illustrative embodiment.

B. Performing a Security Procedure Over a Control Plane with an Indication to Bypass Storage Referring now to FIG. 5, depicted is a process 500 of a process of performing a security procedure over a control plane with an indication to bypass storage. At steps 514 and 516, the remote UE 502 and relay UE 504 may be registered with the network (e.g., via a remote AFM 506). The UE-to-Network relay may be authenticated and authorized by the network to provide support as a relay UE. The remote UE 502 may be authenticated and authorized by the network to act as a Remote UE.

As step 518, the remote UE 502 may initiate discovery procedure using any of Model A or Model B method. At steps 520-526, after the discovery of the UE-to-Network relay, the Remote UE 502 may send a Direct Communication Request to the relay UE 504 for establishing a secure PC5 unicast link. The Remote UE 502 may include its security capabilities and security policy in the DCR message. The message may also include a SUCI, Relay Service Code, and Nonce_1, among others. Upon receiving the DCR message, the relay UE 504 may send the relay key request to the relay AMF 508, including the parameters received in the DCR message. The relay AMF 508 may verify whether the relay UE 504 is authorized to act as a U2N relay. The relay AMF 508 may select a remote AUSF 510 based on SUCI and forward the key request to the remote AUSF 510 in a Nausf_UEAuthentication_Authenticate Request message.

At step 528, the remote AUSF 510 may retrieve the Authentication Vectors (AV) from the UDM 512 by sending an AV get request message, such as a a Nudm_UEAuthentication_Get request. This AV get request message may include the remote UE's SUCI and a store indication parameter. This store indication parameter may be used to indicate to the UDM 512 to not store the remote AUSF 510 related information (e.g., remote AUSF instance ID, and AVs) which is to trigger this primary authentication. The store indication parameter may be a service code (Relay service code or some other service code), a freshness parameter (random number), a constant, and some default value, among others. At step 530, the UDM 512 sends a response to the remote AUSF 510 which includes the AVs. UDM 512 should not store the related information about the remote AUSF 510 (e.g., AVs).

At step 532, the remote AUSF 510 may retrieve the Authentication Vectors from the UDM 512 and can trigger the primary authentication of the remote UE 502 using existing procedure. This authentication is performed between the remote AUSF 510 and the remote UE 502 via the relay AMF 508 and relay UE. The remote AUSF 510 may not make the newly derived $K_{AUSF}$ as the latest $K_{AUSF}$. At the remote UE, the newly derived $K_{AUSF}$ may not be taken as latest $K_{AUSF}$ as NAS SMC procedure is not performed between remote UE 502 and relay AMF 508. After step 532, the relay AMF 508 does not run NAS SMC, based on (or in response to) certain information (e.g., in the relay service code).

At steps 534 and 536, on successful primary authentication, the remote AUSF 510 and Remote UE 502 may generate 5GPRUK and 5GPRUK ID using the newly derived $K_{AUSF}$. At step 538, the remote AUSF 510 may generate the $K_{NR\_ProSe}$ key. At step 540, the remote AUSF 510 may send the 5GPRUK ID, $K_{NR\_ProSe}$, Nonce_2 in Nausf_UEAuthentication_Authenticate Response message to the UE-to-Network relay via relay AMF 508. When receiving a $K_{NR\_ProSe}$ from the remote AUSF, the relay AMF 508 may not attempt to trigger NAS SMC procedure with remote UE 504. At step 542, the relay AMF 508 may delete information related to the remote UE. The relay AMF 508 can send the 5GPRUK ID, $K_{NR\_ProSe}$, Nonce_2 in a relay key response to the relay UE. Relay UE 504 may derive PC5 session key $K_{relay-sess}$ and confidentiality and integrity keys from $K_{NR\_ProSe}$, using the KDF. $K_{NR\_ProSe}$ ID and $K_{relay-sess}$ ID may be established in the same way as $K_{NRP}$ ID and $K_{NRP-sess}$ ID.

At step 544, the UE-to-Network relay may send the received 5GPRUK ID, Nonce_2 to the Remote UE 502 in Direct Security mode command message. At steps 546 and 548, the remote UE 502 may use the 5GPRUK ID to locate the $K_{AUSF}$ or 5GPRUK to be used for the PC5 link security. Remote UE 502 may generate the $K_{NR\_ProSe}$ key to be used for Remote access via the Relay UE 504 in the same way as defined in step 538. The Remote UE 502 may derive PC5 session key $K_{relay-sess}$ and confidentiality and integrity keys from $K_{NR\_ProSe}$ the same way as defined in step 542. Remote UE 502 may send the Direct Security mode complete message to the UE-to-Network relay.

C. Authenticating User Equipment for User Equipment to Network Relay

Figure 6:
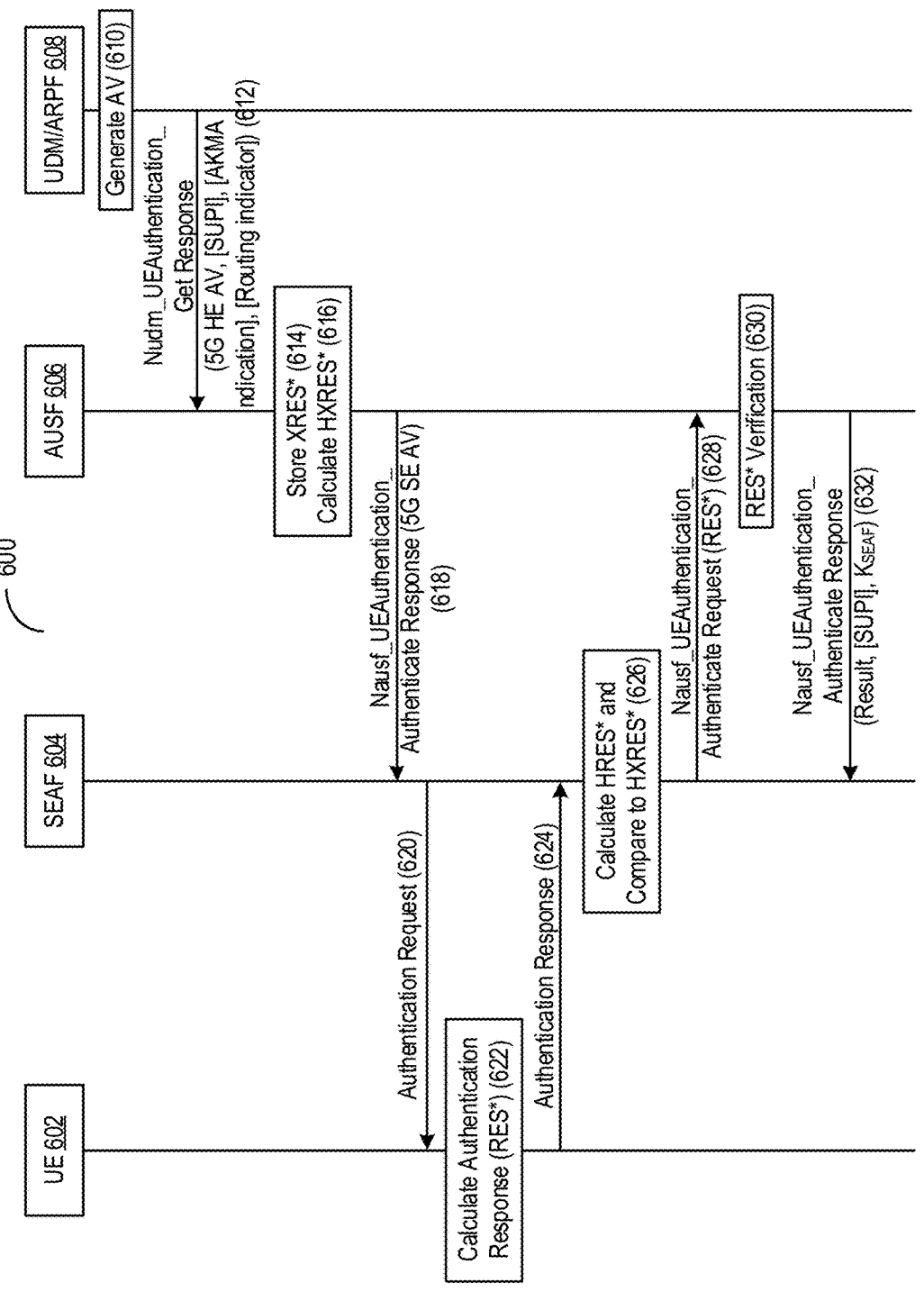
FIG. 6 illustrates a block diagram of a process of authenticating remote user equipment (UE) in accordance with an illustrative embodiment.

Referring now to FIG. 6, depicted is a block diagram of a process 600 of authenticating remote user equipment (UE). Further communication between the remote UE 602 and Network may place securely via the UE-to-Network relay. As depicted, at step 610, a UDM 608 or authentication credential repository and processing function (ARPF) may generate the AV. The UDM 608 may send a response including the AV, along with a SUPI, an authentication and key management for application (AKMA), and a routing indicator, among others. At step 614, the AUSF may store an expected result (XRES*). At step 616, the AUSF may generate a hash of the expected result (HXRES*).

At step 618, the AUSF 608 may send the result to a security anchor function (SEAF) 604. If the AUSF indicates that the authentication was successful from the home network point of view, then the AMF may initiate NAS security mode command procedure (with the UE, to take the newly generated partial native 5G NAS security context into use in steps 620-632. In some embodiments, the AMF may omit the initiation of the NAS SMC procedure.

Figure 7:
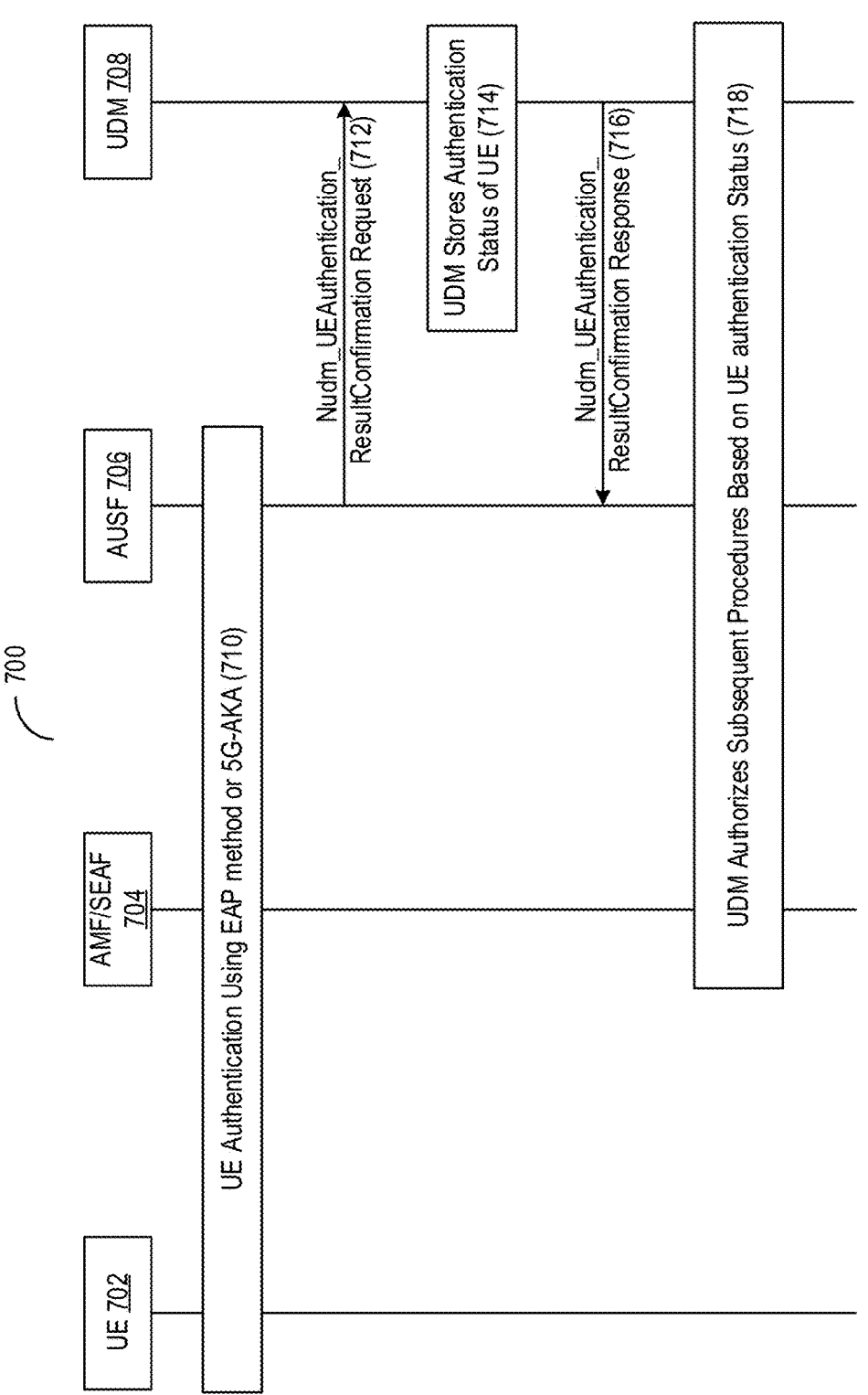
FIG. 7 illustrates a block diagram of a process of authorizing for subsequent procedures in accordance with an illustrative embodiment.

Referring now to FIG. 7, depicted is a block diagram of a process 700 of authorizing for subsequent procedures. At step 710, the UE 702 may perform an authentication with an AUSF 706. With steps 712 and 714, after the UDM 708 is informed that the UE 702 has been successfully (re-)authenticated, the UDM 708 may store the AUSF 706 instance which reported the successful authentication. At step 716, if the UDM 708 has been previously informed that the UE 702 was authenticated by a different AUSF 706 instance, the UDM 708 may request the old AUSF 706 to clear the stale security parameters (KAUSF, steering of roaming (SOR) counter and UE parameter update counter).

With step 718, the information sent from the AUSF 706 to the UDM 708 that a successful or unsuccessful authentication of a subscriber has occurred, may be used to link authentication confirmation to subsequent procedures. The AUSF 706 may send the Nudm_UEAuthentication_ResultConfirmation service operation. In some embodiments, the AUSF 706 may use some message replace the step 710 to indicate UDM 708 not to store the AUSF 706 instance information.

D. Handling Authentication of Remote Wireless Communication Devices

Figure 8:
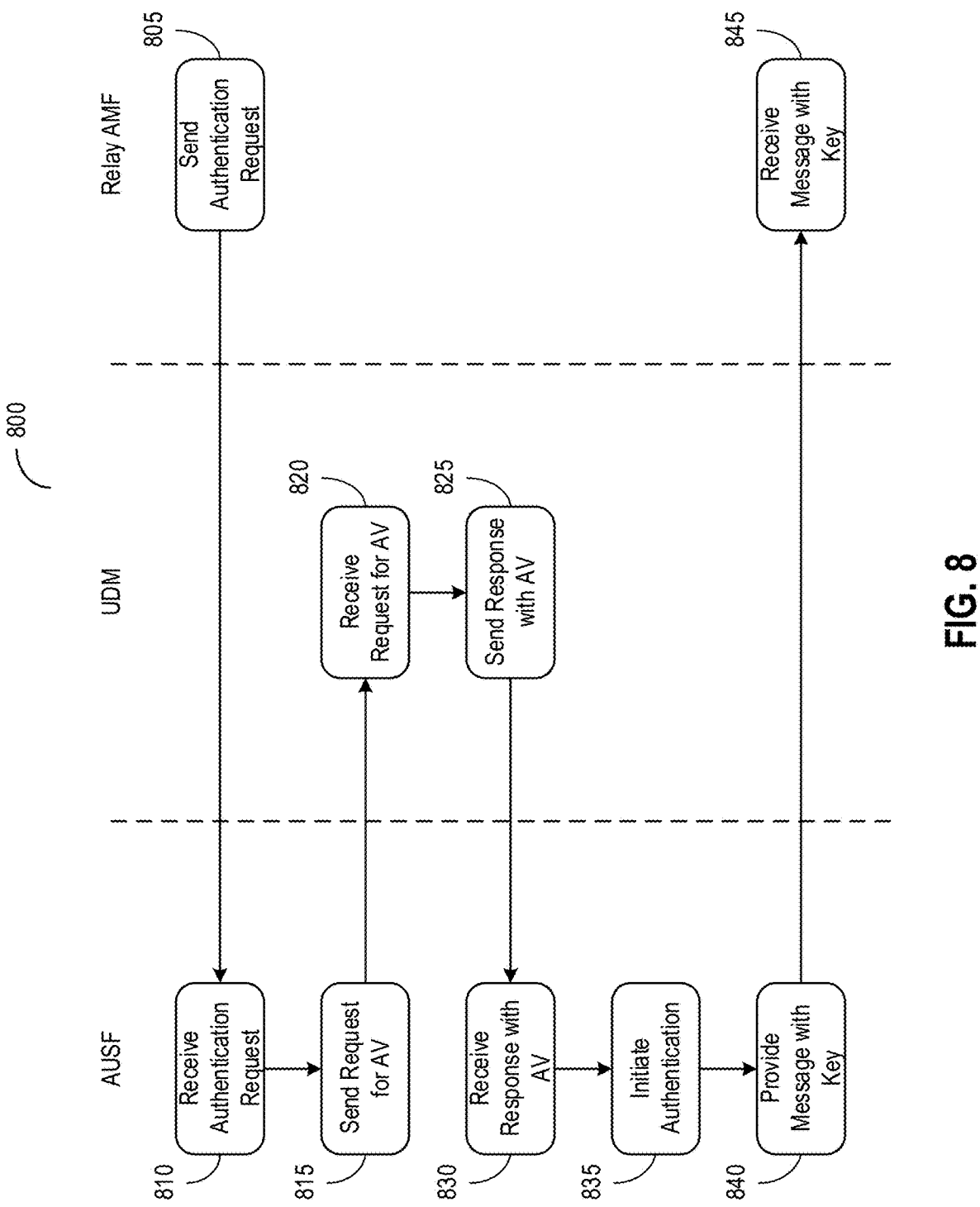
FIG. 8 illustrates a function band diagram of a method of authenticating remote wireless communication devices in accordance with an illustrative embodiment.

Referring now to FIG. 8, depicted is a function band diagram of a method 800 of authenticating remote wireless communication devices. The method 800 may be implemented using or performed by any of the components detailed above, such as the UE 104 or 204 and BS 102 or 202, relay AMF 408 or 508, AUSF 410 or 510, and UDM 412 or 512, among others. In brief, a relay access and mobility function (AMF) may send an authentication request to an authentication server function (AUSF) (805). The AUSF may receive the authentication request (810). The AUSF may send a request for authentication vectors (AV) to a unified data management (UDM) (815). The UDM may receive the request for AV from the AUSF (820). The UDM may send a response with AV to the AUSF (825). The AUSF may receive the response with the AV from the UDM (830). The AUSF may initiate authentication (835). The AUSF may provide a message with a key to the relay AMF (840). The relay AMF may receive the message with the key (845).

In further detail, a relay access and mobility function (AMF) (e.g., the relay AMF 408 or 508) may provide, transmit, or otherwise send an authentication request to an authentication server function (AUSF) (e.g., the AUSF 410 or 510) (805). The authentication request may identify or include one or more of: an identifier of a remote wireless communication device (e.g., relay UE 104, 204, 402, or 502), a subscription concealed identifier (SUCI), a relay service code, a nonce, or a name of a network (e.g., serving network name), among others. The authentication request may be, for example, a Nausf_UEAuthentication_Authenticate Request message generated by the relay AMF in association with the remote wireless communication device seeking authorization to access a network (e.g., 5GC). The AUSF may retrieve, identify, or otherwise, receive the authentication request from the AMF (810). Upon receipt from the AMF, the AUSF may process or parse the authentication request to extract or identify the identifier of the remote wireless communication device, the SUCI, the relay service code, and the nonce, among others.

The AUSF may transmit, provide, or otherwise send a request for authentication vectors (AV) to a unified data management (UDM) (815). From parsing the authentication request from the relay AMF, the AUSF may generate the request for AVs. The AVs may be used to authenticate the remote wireless communication device to access the network. In some embodiments, the request may be in association with the remote wireless communication device seeking authorization to access the network via a relay wireless communication device (e.g., UE 104, 204, or relay UE 404, or 504). The request may identify or include an indicator to indicate to the UDM to forego, refrain, or otherwise bypass storing information related to the AUSF. In some embodiments, the request may lack a specific indicator to indicate the UDM to bypass the storage of the information related to the AUSF. For example, the request may identify or include the SUCI to obtain the AV from the UDM, and to indicate to the UDM to not store the AUSF related information. The information related to the AUSF may identify or include an identifier of the AUSF or one or more AVs, among others.

In some embodiments, the indicator (included in the request) may identify or include one or more of: the identifier of the remote wireless communication device, the SUCI, a subscriber permanent SUPI, or the name of the network, among others. When the name of the network is provided by the remote AMF, the AUSF may include the name of the network into the indicator to provide to the UDM. Otherwise, when the name of the network is not provided by the remote AMF, the AUSF may refrain from including the name of the network in the indicator, and the indicator may lack the name of the network. The AUSF may also use the name of the network in which the AUSF is located. In some embodiments, the indicator may identify or include one or more of a relay service code or other service code, a freshness parameter value, or a default or defined value (e.g., a constant value).

The UDM may retrieve, identify, or otherwise receive the request for AV from the AUSF (820). With receipt of the request, the UDM may process or parse the request for AV. In some embodiments, the received request may be in association with the remote wireless communication device seeking authorization to access the network via the relay wireless communication device. In some embodiments, from parsing, the UDM may extract or identify the indicator to indicate to the UDM to bypass the storing of the information related to the AUSF. In response to the receipt, the UDM may create or generate the AV for authenticating the remote wireless communication device to authenticate with the network. The AV may identify or include one or more of: a random value (RAND), an authentication token (AUTN), expected value (XRES*), and security key (e.g., KAUSF), among others. The AV may be a part of the information related to the AUSF. Upon identifying the indicator, the UDM may forego, refrain, or otherwise bypass storing the information related to the AUSF, including the AV.

In some embodiments, the UDM may transmit, provide, or otherwise send a response with AV to the AUSF (825). The response may identify or include the AV sent to the AUSF in response to the request for AV. The provision of the response with the AV may cause the AUSF to initiate authentication. In some embodiments, the response may identify or include the information related to the AUSF. In some embodiments, the UDM may otherwise cause the AUSF to initiate authentication of the remote wireless communication device seeking authorize to access the network via the relay wireless communication device. For example, the UDM may provide the information related to the AUSF to trigger the AUSF to initiate the authentication. The AUSF may retrieve, identify, or otherwise receive the response with the AV from the UDM (830). Upon receipt from the UDM, the AUSF may process or parse the response to extract or identify the AV.

The AUSF may commence, start, or otherwise initiate the authentication of the wireless communication device (835). In some embodiments, the AUSF may initiate the authentication in response to receipt of the response including the AV (or the information related to the AUSF) from the UDM. The authentication may be performed between the AUSF and the remote wireless communication device via the relay AMF and the relay wireless communication device (e.g., in accordance with processes 600 and 700). In some embodiments, after the completion of authentication, the AUSF may transmit, provide, or otherwise send a message to indicate to the UDM to bypass storing the information related to the AUSF. The AUSF may have previously omitted the indicator in the request for the AV, and send the indicator subsequent to successful authentication of the remote wireless communication device. In turn, the UDM may retrieve, identify, or otherwise receive the message indicating to the UDM to bypass the storing of the information related to the AUSF. Upon receipt, the UDM may refrain or bypass the storage of the information related to the AUSF at the UDM.

The AUSF may transmit, send, or otherwise provide an authentication response message with a key to the relay AMF (840). In some embodiments, the AUSF may determine, create, or otherwise generate a proximity services key (e.g., $K_{NR\_ProSe}$ key) after successful completion of the authentication. With the generation, the AUSF may transmit, provide, or otherwise send an authentication response message to the relay AMF to be sent to the relay wireless communication device. The authentication response message may identify or include the proximity services key, among others.

The relay AMF may retrieve, identify, or otherwise receive the message with the key from the AUSF (845). In some embodiments, the relay AMF may retrieve, identify, or otherwise receive the authentication response message from the AUSF. Upon receipt, the relay AMF may process or parse the authentication response message to extract or identify the proximity services key, among others. In addition, the relay AMF may transmit, provide, or otherwise send a relay key response to the relay wireless communication device. The sending of the relay key response may be in response to the receipt of the authentication response message. In some embodiments, the relay AMF may delete or remove the information related to the remote wireless communication device. Upon receipt of the relay key response, the relay wireless communication device may remove, erase, or otherwise delete information related to the remote wireless communication device. In some embodiments, the information may identify or include a non-access stratum security context information, an AMF key, the identity of the remote wireless communication device, the SUCI, or the SUPI, among others.

After completion of the authentication, the relay AMF may not commence, start, or otherwise initiate a network access stratum (NAS) security mode command (SMC) procedure with the remote wireless communication device. The refraining from the initiation of the NAS SMC procedure with the remote wireless communication device may be in response to receipt of the authentication response message. In some embodiments, the relay AMF may not initiate NAS SMC procedure based on information. The information may identify or include a relay service code, the identity of the remote wireless communication device, or the SUCI, among others.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:
sending, by an authentication server function (AUSF) to a unified data management (UDM), a request for authentication vectors (AVs) in association with a remote wireless communication device seeking authorization to access a network via a relay wireless communication device, the request comprising an indicator to indicate to the UDM to bypass storing information related to the AUSF;
receiving, by the AUSF from a relay access and mobility management function (AMF), an authentication request comprising at least one of: an identifier of the remote wireless communication device, a subscriber concealed identifier (SUCI), a relay service code, a nonce, or a name of the network; and
receiving, by the AUSF from the UDM, the AVs in response to the request,
wherein after successful completion of authentication of the remote wireless communication device, the method further comprises:
generating, by the AUSF, a proximity services key;
sending, by the AUSF to a relay wireless communication device via the relay AME, an authentication response message comprising the proximity services key; and
causing the relay AMF to send a relay key response to the relay wireless communication device, wherein the relay AMF deletes information related to the remote wireless communication device.

2. The method of claim 1, comprising:
initiating, by the AUSF, authentication of the remote wireless communication device, in response to receiving the AVs.

3. The method of claim 1, wherein the indicator comprises at least one of: an identifier of the remote wireless communication device, a subscriber concealed identifier (SUCI), a subscriber permanent identifier (SUPI), or a name of the network.

4. The method of claim 1, wherein the indicator comprises a relay service code or other service code, a freshness parameter value, or a default or defined value.

5. The method of claim 1, wherein the information related to the AUSF includes at least one of: an identifier of the AUSF, or the AVs.

6. The method of claim 1, wherein after completion of the authentication, the relay AMF does not initiate a network access stratum (NAS) security mode command (SMC) procedure with the remote wireless communication device.

7. The method of claim 6, wherein the relay AMF does not initiate the NAS SMC procedure, based on information comprising at least one of: a relay service code, a remote wireless communication device's identity, or a subscriber concealed identifier (SUCI).

8. The method of claim 1, where the information related to the relay wireless communication device comprises at least one of: non access stratum security context information, an access and mobility management function (AMF) key, an identity of the remote wireless communication device, a subscriber concealed identifier (SUCI) or a subscriber permanent identifier (SUPI).

9. A method comprising:
receiving, by a unified data management (UDM) from an authentication server function (AUSF), a request for authentication vectors (AVs) in association with a remote wireless communication device seeking authorization to access a network via a relay wireless communication device, the request comprising an indicator to indicate to the UDM to bypass storing information related to the AUSF; and
sending, by the UDM to the AUSF, the AVs in response to the request, wherein the AUSF receives from a relay access and mobility management function (AMF), an authentication request comprising at least one of: an identifier of the remote wireless communication device, a subscriber concealed identifier (SUCI), a relay service code, a nonce, or a name of the network,
wherein after successful completion of authentication of the remote wireless communication device, the AUSF generates a proximity services key, sends to a relay wireless communication device via the relay AMF an authentication response message comprising the proximity services key, and causes the relay AMF to send a relay key response to the relay wireless communication device, wherein the relay AMF deletes information related to the remote wireless communication device.

10. A unified data management (UDM), comprising:
at least one processor configured to:
receive, via a transceiver from an authentication server function (AUSF), a request for authentication vectors (AVs) in association with a remote wireless communication device seeking authorization to access a network via a relay wireless communication device, the request comprising an indicator to indicate to the UDM to bypass storing information related to the AUSF; and
send, via the transceiver to the AUSF, the AVs in response to the request, wherein the AUSF receives from a relay access and mobility management function (AMF), an authentication request comprising at least one of: an identifier of the remote wireless communication device, a subscriber concealed identifier (SUCI), a relay service code, a nonce, or a name of the network,
wherein after successful completion of authentication of the remote wireless communication device, the AUSF generates a proximity services key, sends to a relay wireless communication device via the relay AMF an authentication response message comprising the proximity services key, and causes the relay AMF to send a relay key response to the relay wireless communication device, wherein the relay AMF deletes information related to the remote wireless communication device.

11. An authentication server function (AUSF), comprising:

at least one processor configured to:

send, via a transceiver to a unified data management (UDM), a request for authentication vectors (AVs) in association with a remote wireless communication device seeking authorization to access a network via a relay wireless communication device, the request comprising an indicator to indicate to the UDM to bypass storing information related to the AUSF;

receive, from a relay access and mobility management function (AMF), an authentication request comprising at least one of: an identifier of the remote wireless communication device, a subscriber concealed identifier (SUCI), a relay service code, a nonce, or a name of the network; and receive, via the transceiver from the UDM, the AVs in response to the request, wherein after successful completion of authentication of the remote wireless communication device, the at least one processor is further configured to:

generate a proximity services key;

send, to a relay wireless communication device via the relay AMF, an authentication response message comprising the proximity services key; and cause the relay AMF to send a relay key response to the relay wireless communication device, wherein the relay AMF deletes information related to the remote wireless communication device.

12. The AUSF of claim 11, wherein the at least one processor is configured to:

initiate authentication of the remote wireless communication device, in response to receiving the AVs.

13. The AUSF of claim 11, wherein the indicator comprises at least one of: an identifier of the remote wireless communication device, a subscriber concealed identifier (SUCI), a subscriber permanent identifier (SUPI), or a name of the network.

14. The AUSF of claim 11, wherein the indicator comprises a relay service code or other service code, a freshness parameter value, or a default or defined value.

15. The AUSF of claim 11, wherein the information related to the AUSF includes at least one of: an identifier of the AUSF, or the AVs.

16. The AUSF of claim 11, wherein after completion of the authentication, the relay AMF does not initiate a network access stratum (NAS) security mode command (SMC) procedure with the remote wireless communication device.

* * * * *